United States Patent [19]
Mochimaru

[11] 4,105,326
[45] Aug. 8, 1978

[54] ELECTROPHOTOGRAPHIC COPYING MACHINES OF VARIABLE MAGNIFICATION

[75] Inventor: Hideaki Mochimaru, Yokohama, Japan

[73] Assignee: Ricoh Company, Ltd., Tokyo, Japan

[21] Appl. No.: 712,713

[22] Filed: Aug. 9, 1976

[30] Foreign Application Priority Data

Aug. 9, 1975 [JP] Japan .................................. 50/97026

[51] Int. Cl.[2] ........................ G03B 27/52; G03B 27/70
[52] U.S. Cl. ........................................... 355/55; 355/60
[58] Field of Search .................... 355/8, 11, 48, 49, 50, 355/51, 55, 57, 60, 66

[56] References Cited

U.S. PATENT DOCUMENTS

| | | | |
|---|---|---|---|
| 2,323,600 | 7/1943 | Heybourne | 355/60 |
| 3,354,777 | 11/1967 | Normandy et al. | 355/50 X |
| 3,560,087 | 2/1971 | Washio et al. | 355/8 X |
| 3,592,542 | 7/1971 | Käufer et al. | 355/50 |
| 3,598,489 | 8/1971 | Thomas et al. | 355/60 X |
| 3,737,223 | 6/1973 | Yamamoto | 355/50 X |
| 3,912,392 | 10/1975 | Shogren | 355/66 |
| 4,007,986 | 2/1977 | Komori et al. | 355/60 X |

*Primary Examiner*—Donald A. Griffin
*Attorney, Agent, or Firm*—Cooper, Dunham, Clark, Griffin & Moran

[57] ABSTRACT

An electrophotographic copying machine of the type in which an original and a photosensitive member are both moved while maintaining a given optical relationship therebetween so that an optical system interposed between them focuses an image of the original onto the photosensitive member. A conveyor means is provided in the top portion of the machine, along with a plurality of original carriers for enabling a copying process to be performed at various magnifications which may be either equal to, greater or less than unity, the respective carriers being selectively adapted, when placed on the conveyor means to locate the original thereon at different respective distances from the optical system. Each carrier is moved with a varying speed which depends on the desired magnitude of the magnification while the photosensitive member is driven with a uniform speed.

2 Claims, 10 Drawing Figures

ELECTROPHOTOGRAPHIC COPYING MACHINES OF VARIABLE MAGNIFICATION

BACKGROUND OF THE INVENTION

The invention relates to copying machines of the type involving the movement of an original as a copy sheet such as a photosensitive paper or transfer sheet is moved, and more particularly, to such copying machines which permit a copying process at a magnification which is either equal to, or greater, or less than unity.

In conventional copying machines having a magnification of unity, the arrangement is such that an original can be moved with the same speed as a copy sheet, and the optical distance from the original to an optical system is maintained substantially equal to the optical distance from the latter to the copy sheet. When it is desired to utilize such a machine to perform a copying process at a varying magnification which is either greater or less than unity, it must satisfy additional requirements, which will be described below with reference to FIG. 1.

Referring to FIG. 1 which schematically shows a basic optical system in a copying process permitting a varying magnification, there is shown an in-mirror-lens 1 having a focal length of $f$, and the value of the magnification of the image on a copy sheet 3 with respect to the image of an original 2 is assumed to be $m$. When both the original 2 and the copy or photosensitive sheet 3 are placed on the same line $l_0$, a copying process at a magnification of unity is achieved by locating the in-mirror-lens 1 at a distance of $2f$ from the line $l_0$ (as shown in solid lines) and moving the original and the photosensitive sheet with an equal speed.

If a copying operation is desired at a reduced magnification or at a value of magnification less than unity, the photosensitive sheet 3 is left in position while the original 2 is disposed on a line $l_1$ which is shifted from the line $l_0$ by a distance of $f(1/m - m)$ and the in-mirror-lens 1 is transposed to a position indicated by a phantom line which is transposed by $f(1 - m)$ on the optical axis toward the line $l_0$. Specifically, representing the distance between the lens 1 (shown in solid line) and the original 2 by $a$ and the distance between the lens 1 and the photosensitive sheet 3 by $b$, the following relationships apply:

$$1/a + 1/b = f, \text{ and } m = b/a.$$

By rewriting, $$a = f(1 + 1/m), \text{ and } b = f(1 + m).$$

This indicates that the displacement of the original and the in-mirror-lens should be $f(1/m - m)$ and $f(1 - m)$, respectively. Assuming that the photosensitive sheet 3 has a width $L_1$ across which it is slitwise exposed and which is at a spacing $L_2$ from the optical axis, it follows from the optical relationships that the original 2 located on the line $l_1$ should have a width $L_1/m$ across which it is slitwise irradiated and which is at a spacing of $L_2/m$ from the optical axis. Thus, by increasing the speed of movement of the original 2 by a factor $1/m$ $(m < 1)$ higher than that of the photosensitive sheet 3, a reduced image of a width $L_1$ can be formed on the sheet 3 from an original having a width of $L_1/m$.

When a copying operation is desired at an increased magnification or at a magnification $m > 1$, the original 2 is disposed on a line $l_2$ which is transposed from the line $l_0$ toward the lens 1 by an amount equal to $|f(1/m - m)|$ while the lens is transposed to a position which is further removed from its position shown in solid line by an amount equal to $|f(1 - m)|$. In addition, the speed of movement of the original 2 is reduced below the speed of movement prevailing at a magnification of unity, by a factor corresponding to the reciprocal of magnification $1/m$ $(m > 1)$. Then, an image of a width $L_1/m$ $(m > 1)$ on the original 2 will be increased to a width of $L_1$ on the sheet 3.

It will be appreciated from the foregoing discussions that in order to permit a copying operation at a varying magnification below and above unity, it is necessary that the original can be placed at a varying distance from the optical system, that the focussing lens such as the in-mirror-lens mentioned above can be moved through a selected distance along the optical axis, and that the original can be moved with a speed which depends on the magnitude of the magnification.

SUMMARY OF THE INVENTION

In accordance with the invention, an electrophotographic copying machine of a variable magnification comprises conveyor means disposed in the top portion of the machine, and a plurality of original carriers which are adapted to ride on the conveyor means. The carriers each comprise a transparent receptacle on which an original may be placed, and a pair of guide members located along and attached to the opposite lateral sides of the receptacle. The guide members on one of the carriers are of a different configuration from those on another. The conveyor means comprises a plurality of rotating guiding shafts each having portions of different diameters. By selectively placing one of the carriers on a selected portion of the guiding shafts, an original thereon is located at a given distance from the optical system which varies in accordance with a desired magnification. In addition, the conveyor means is associated with a variable speed gearing so that the carriers can be driven with different speeds which relate to the magnitude of the magnification. On the other hand, the photosensitive or copy sheet is moved with a uniform speed, thereby enabling a variable magnification copying operation.

The conveyor means may comprise a conveyor belt capable of changing speed.

It is to be understood that the invention is equally applicable to a copying machine which utilizes the transfer of images.

In view of the foregoing, it is an object of the invention to provide an electrophotographic copying machine capable of variable magnification of a type in which an original is moved as a photosensitive member moves.

It is another object of the invention to provide an electrophotographic copying machine capable of variable magnification including original carriers which are selectively placed on conveyor means, thereby enabling the magnification to be changed in a simple manner.

DETAILED DESCRIPTION OF PREFERRED EMBODIMENTS

Figure 1:
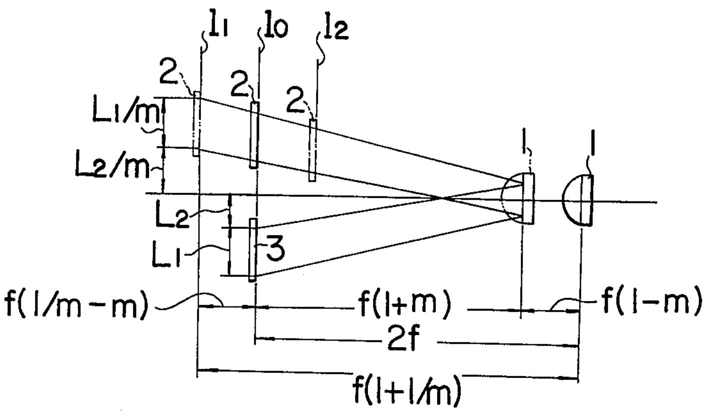
FIG. 1 is a schematic diagram of a basic optical system which illustrates the underlying principle of the invention.
Figure 2:
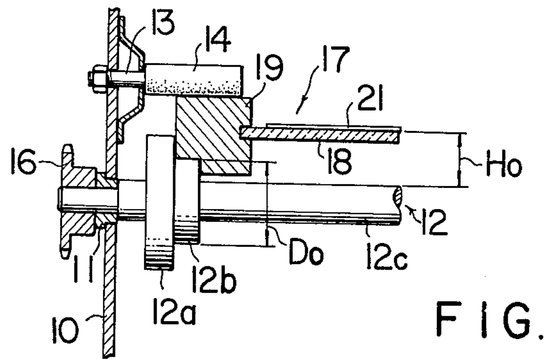
FIG. 2 is a side elevation, partly in section, of one of the original carriers mounted on a rotary guiding shaft, the selected carrier being used for a copying operation at a magnification of unity.
Figure 4:
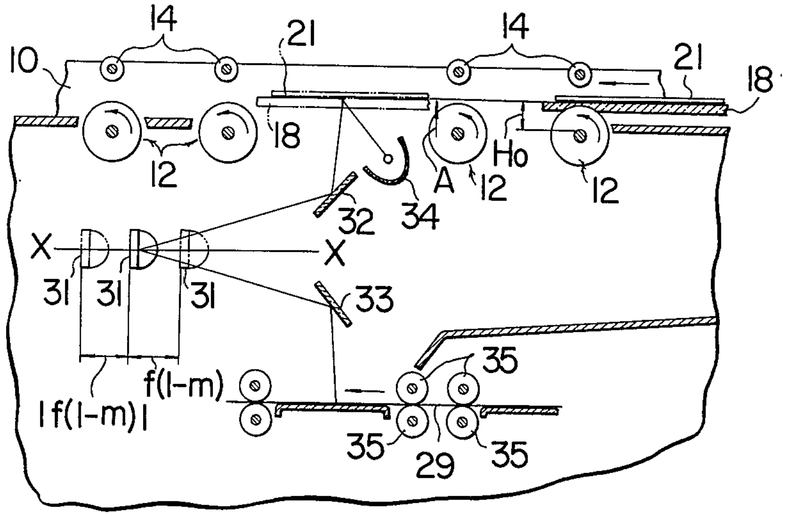
FIG. 4 is a front view, partly in section, of an electrophotographic copying machine capable of variable magnification constructed in accordance with one embodiment of the invention.

Referring to FIG. 2, there is shown a vertical plate 10 which is located in opposing relationship with a counterpart, not shown, and a conveyor guiding shaft 12 which forms part of rotary conveyor means is rotatably mounted in these plates by means of bearing 11 (only one being shown). A stub shaft 13 is also mounted in the plate 10 in parallel relationship with the shaft 12, and rotatably carries a follower roller 14 of a resilient material such as rubber thereon. The guiding shaft 12 and the follower roller 14 form a cooperating pair, and a plurality of such pairs are arranged in parallel relationship in the top portion of a copying machine, as illustrated in FIG. 4. Toward its opposite ends, the guiding shaft 12 is formed with symmetrically disposed pairs of large diameter portions 12*a*, medium diameter portions 12*b* and small diameter portions 12*c*. A stub shaft corresponding to the stub shaft 13 is mounted in the vertical plate which represents the counterpart of the vertical plate 10, and rotatably carries thereon a follower roller 15 which is similarly constructed as the follower roller 14. A pair of sprocket wheels 16 are fixedly mounted on the opposite ends of the guiding shaft 12, and are connected with a suitable chain drive so as to be driven for rotation at a uniform rate.

Figure 3:
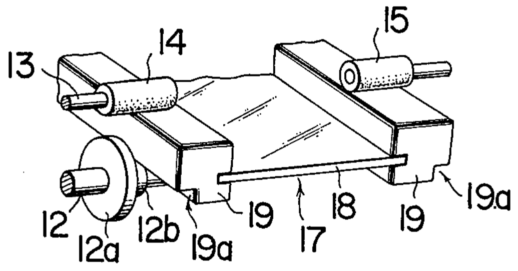
FIG. 3 is a perspective view of the arrangement of FIG. 2.

The portions of the guiding shaft 12 which are of different diameters are adapted to receive thereon original carriers which are used for magnifications equal to, greater, and less than unity. FIGS. 2 and 3 show an original carrier 17 which is used for a magnification of unity. The carrier 17 comprises a transparent receptacle 18 which receives an original 21 thereon, and a pair of guide members 19 which are fixedly attached to the lateral edges of the receptacle 18 and having a notched step 19*a* formed in their bottom. When the carrier 17 is mounted between the guiding shafts 12 and the follower rollers 14 with the notched steps 19*a* engaging the medium diameter portions 12*b* as shown in FIG. 2, the original 21 placed on the receptacle 18 is located at a given distance from the optical system which is necessary to achieve the magnification of unity. The spacing or distance between the original 21 and the small diameter portion 12*c* of the guiding shaft 12 is represented by $H_0$.

Figure 5:
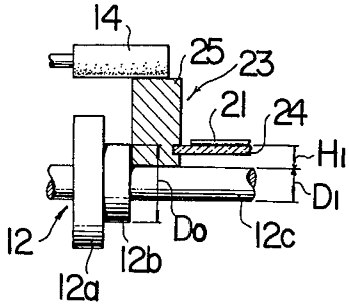
FIGS. 5 and 6 are fragmentary side elevations of original carriers, which are used during respective copying operations at a magnification greater and less than unity, as mounted on a conveyor guiding shaft.
Figure 6:
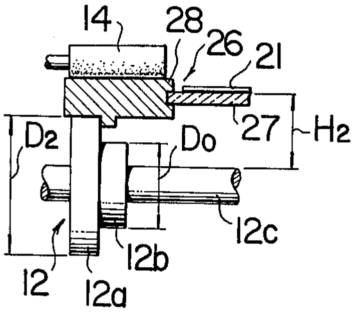

Referring to FIG. 5, there is shown an original carrier 23 which is used for a magnification greater than unity. It comprises a transparent receptacle 24 similar to the receptacle 18 shown in FIGS. 2 and 3, and a pair of guide members 25 fixedly attached to the opposite lateral sides thereof. The guide members 25 are adapted to be received between the follower rollers 14 and 15 and the small diameter portions 12*c* of the guiding shafts 12 so as to locate the original 21, when placed on the receptacle 24, at a distance from the optical system which is required to achieve a desired magnification greater than unity. The distance between the original 21 and the small diameter portion 12*c* is represented by $H_1$. In a similar manner, FIG. 6 shows an original carrier 26 which is used for a magnification less than unity. The carrier 26 comprises a transparent receptacle 27 and a pair of guide members 28 fixedly attached to the opposite lateral sides of the receptacle 27. The guide members 28 are of a size such that they are received between the follower rollers 14 and 15 and the large diameter portions 12*a* of the guiding shafts 12, and when so mounted, serve to locate an original 21 placed on the receptacle 27 at a distance from the optical system that will achieve a desired reduction in size or a magnification less than unity. The distance between the original 21 and the small diameter portion 12*c* is shown by $H_2$ in FIG. 6.

The receptacle 24 is located relative to the guide members 25 such that the difference between the distances $H_0$ and $H_1$ is equal to $|f(1/m - m)|$, with the consequence that for $m > 1$ or for a magnification greater than unity, the original 21 will be located by an amount $|f(1/m - m)|$ nearer the optical system in reference to the position which it assumes for a magnification of unity. The receptacle 27 is similarly located relative to the guide members 28 such that the difference between the distances $H_2$ and $H_0$ is equal to $f(1/m - m)$, with the consequence that for $m < 1$ or for a magnification less than unity, the original 21 will be by an amount $f(1/m - m)$ further removed from the optical system with reference to the position which it assumes for a magnification of unity.

Referring to FIG. 2, the medium diameter portion 12*b* of the guiding shaft 12 has a diameter $D_0$ which is determined such that the peripheral speed of the portion 12*b* is equal to the travelling speed of a photosensitive sheet 29 (see FIG. 4) which is used as a photosensitive member, when the sprocket wheels 16 are driven at a given uniform angular rate. Referring to FIG. 5, the diameter $D_1$ of the small diameter portion 12*c* of the guiding shaft 12, which is engaged by the guide member 25 of the original carrier 23 used with a magnification greater than unity, is determined to be $D_1 = D_0/m$, for $m > 1$. This can be understood by assuming a travelling speed of V for the original at a magnification of unity. At a magnification of $m$ greater than unity, the travelling speed will be $V/m$. Assuming an angular velocity $\omega$ for the guiding shaft 12, the peripheral speed of the small diameter portion 12*c* will be equal to $(D_1/2) \times \omega$ while the peripheral speed of the medium diameter portion 12*b* will be $(D_0/2) \times \omega$. Since these peripheral speeds should be equal to the corresponding travelling speeds of the original, $(D_1/2) \times \omega = (D_0/2) \times \omega/m$ or $D_1 = D_0/m$. In a similar manner, the diameter $D_2$ of the large diameter portion 12*a* of the guiding shaft 12 is determined to be $D_2 = D_0/m$, for $m < 1$. In this manner, the original carrier used for a magnification of unity is driven with the same speed as the photosensitive sheet, while original carriers associated with magnifications other than unity are driven with speeds which depend on the magnitude of the magnification $m$.

Referring to FIG. 4, a copying machine according to one embodiment of the invention will be described below. The machine includes an in-mirror-lens 31 which is displaceable along the optical axis X—X, and a pair of first and second mirrors 32, 33 located at symmetrical positions with respect to the optical axis and which form the optical system together with the in-mirror-lens 31. In FIG. 4, the carrier 17 for a magnification of unity is mounted between the follower rollers 14 and the guiding shafts 12 by engaging its guide members 19 with the medium diameter portions 12b althrough only the receptacle 18 is shown. An arrow A represents the starting position where the movement of the carrier is initiated. An original 21 is placed on the receptacle 18 and is held in place by a retainer, not shown. Subsequently, a copying cycle is initiated to energize drive means which causes the guiding shafts 12 to rotate in the direction of respective arrows. As the original carrier is fed by the shafts 12, the rollers 14 rotate by following the movement thereof, and in the course of such movement, the original receptacle 18 reaches its position indicated by phantom lines where the original 21 thereon is irradiated slitwise by light from a lamp 34 and its image focussed through the optical system onto the photosensitive sheet 29. Pairs of feed rollers 35 operate to feed the sheet 29 from a position aligned with that indicated by the arrow A, with the same speed as the original 21. By placing the original 21 on the carrier 17, it is located at a given distance from the optical system which is necessary to achieve a magnification of unity.

For a copying operation at a magnification greater than unity, the carrier 23 is mounted as shown in FIG. 5. The subsequent copying cycle takes place in substantially the same manner as mentioned above. However, the original 21 is located by an amount $|f(1/m - m)|$ nearer the optical system with reference to its position during a magnification of unity, and is moved with a speed depending on the magnitude of the magnification. For a size of image $L_1/m$ ($m > 1$) on the original, the image produced on the photosensitive sheet will have a size of $L_1$. It will be noted that in this instance, the in-mirror-lens 31 is shifted to a position which is by an amount $|f(1-m)|$ removed from the mirrors 32, 33 than the position shown in solid lines ($m = 1$).

For a copying operation at a magnification less than unity, the carrier 26 is mounted as shown in FIG. 6. The original 21 is by an amount $f(1/m - m)$ further removed with reference to the position which it assumed for a magnification of unity, and is moved with a speed dependent on the magnitude of the magnification. The in-mirror-lens 31 is shifted to a position which is by an amount $f(1 - m)$ nearer the mirrors 32, 33 than the position shown in solid lines.

Figure 7:
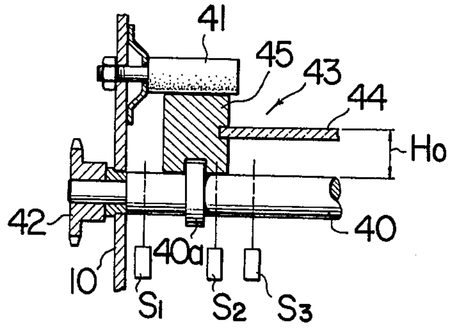
FIG. 7 is a fragmentary side elevation of another form of an original carrier as mounted on a guiding shaft of a different construction.

Referring to FIGS. 7 to 10, another embodiment of the invention will be described below which utilizes different configurations of the guide members for the original carriers depending on the magnitude of the magnification and which suitably controls the rotational speed of the rotary conveyor means by detecting the type of the particular carrier being used. FIG. 7 shows a conveyor guiding shaft 40 which forms the rotary conveyor means, and a follower roller 41, both of which are arranged in a similar manner to those of the previous embodiment. As before, a pair of sprocket wheels 42 are fixedly mounted on the opposite ends of the shaft 40, and are connected through chains with a suitable drive source, not shown, which includes a speed change gearing. An original carrier 43 for a magnification of unity is shown in FIG. 7, and comprises a receptacle 44 on which to receive an original, and a pair of guide members 45 which are fixedly attached to the opposite lateral sides thereof (see FIG. 8). The receptacle 44 is shown as located at a distance of $H_0$ from the upper margin of the shaft 40, and an original placed thereon is located at a distance from the optical system which is necessary to achieve a magnification of unity.

Figure 8:
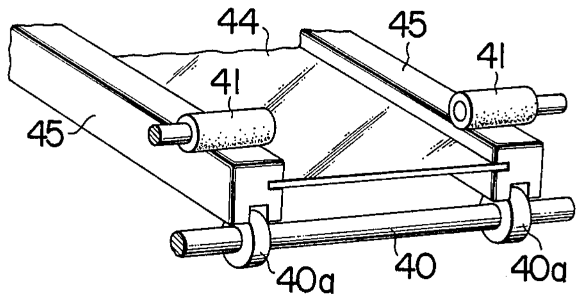
FIG. 8 is a perspective view of the arrangement of FIG. 7.

As shown in FIG. 8, the shaft 40 is formed with a pair of axially spaced collars 40a, which are adapted to engage grooves formed in the bottom of the guide members 45 so as to prevent a movement of the carrier 43 in the axial direction of the shaft 40. A plurality of micro-switches S1, S2, S3 are located to the right of a point which corresponds to the position of the arrow A shown in FIG. 4. These switches have respective actuators, a particular one or a particular combination of which are adapted to engage the guide member of a selected original carrier. In FIG. 7, the actuator of the micro-switch S2 is shown as engaged with the guide member 45.

Figure 9:
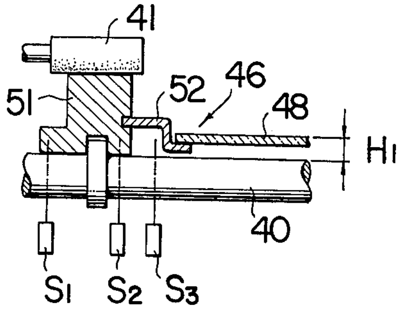
FIGS. 9 and 10 are fragmentary side elevations, illustrating original carriers which are used for magnifications greater and less than unity, respectively, as mounted on a guiding shaft of the construction shown in FIG. 7.
Figure 10:
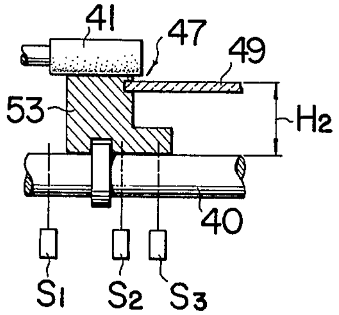

FIGS. 9 and 10 show original carriers 46 and 47, respectively, which are used for a magnification greater and less than unity, respectively. The receptacles 48, 49 of the carriers 46, 47 are shown at distances of $H_1$ and $H_2$, respectively, from the upper margin of the shaft 40. In this manner, an original placed on the receptacle 48 or 49 is located at a distance from the optical system which is required to achieve a desired magnification. In FIG. 9, the receptacle 48 has a guide member 51 attached thereto by means of a fastening member 52. The guide member 51 is adapted to be engaged by the actuators of both micro-switches S1 and S2. In FIG. 10, the receptacle 49 has a pair of guide members 53 (only one being shown) fixedly attached to its opposite lateral sides, and the guide member 53 is adapted to be engaged by the actuators of both micro-switches S2 and S3. The speed change gearing associated with the drive source is arranged to be responsive to the actuation of the micro-switch S2 to drive the shafts 40 so that the original carrier 43 (for magnification of unity) may be moved with the same speed as the photosensitive sheet 29 (see FIG. 4), responsive to the combined actuation of the micro-switches S1 and S2 to enable the original carrier 46 (for magnification greater than unity) to be moved with a speed which depends on the magnitude of the magnification, and responsive to the combined actuation of the micro-switches S2 and S3 to enable the original carrier 47 (for magnification less than unity) to be moved with a speed depending on the magnitude of the magnification.

To perform a copying operation at a magnification of unity, the original carrier 43 is mounted as shown in FIG. 7. The leading ends of the guide members 45 are aligned with the position of the arrow A shown in FIG. 4. Simultaneously with this alignment, the switch S2 is actuated, controlling the speed change gearing to output a speed which is suitable for a copying operation at a magnification of unity. Thus, as the copying cycle is initiated, the carrier 43 is fed at the same speed as the photosensitive sheet, yielding a copy having a magnification of unity. For magnifications other than unity, the actuation of combinations of switches S1 and S2 or S2 and S3 achieves a required speed change, yielding a copy having a desired magnification.

What is claimed is:

1. An electrophotographic copying machine of the variable magnification type comprising:

an optical system; and means for moving both an original and a photosensitive member with respect to said optical system during which an image of the original is focussed onto the photosensitive member through the optical system;

conveyor means for transporting originals;

a plurality of original carriers for supporting the originals on the conveyor means, each of the original carriers including:

an original receptacle on which to receive an original; and a pair of guide members respectively attached to opposite sides of the receptacle, each pair of guide members having means for locating an original placed on the associated receptacle at a respective distance from the optical system in accordance with a selected magnification at which a copying operation is desired;

means for moving each respective carrier, when placed on the conveyor means, with a respective speed having a particular relationship with the speed of movement of the photosensitive member in accordance with the particular magnification selected; and wherein the conveyor means comprises a plurality of conveyor guiding shafts disposed in parallel relationship to each other and all driven for rotation at a selected angular velocity, each of the shafts being formed with a plurality of portions of different diameters including a large diameter portion, a medium diameter portion and a small diameter portion such that a selected original carrier for a magnification less than unity is engaged with the large diameter portion of the shafts when a copying operation at a magnification less than unity is desired, another original carrier for unity magnification is engaged with the medium diameter portion of the shafts when a copying operation at unity magnification is desired, and a further original carrier for a magnification greater than unity is engaged with the small diameter portion of the shafts when a copying operation at a magnification greater than unity is desired.

2. An electrophotographic copying machine of the variable magnification type comprising:

an optical system; and means for moving both an original and a photosensitive member with respect to said optical system during which an image of the original is focussed onto the photosensitive member through the optical system;

the improvement wherein said moving means comprises:

conveyor means for transporting originals comprising a plurality of conveyor shafts disposed in parallel relationship to each other and all driven for rotation at a selected angular velocity, each of the shafts being formed with a plurality of portions of different diameters; and carrier means for carrying the originals on said conveyor means and comprising:

a plurality of carriers, each comprising a receptacle means for receiving an original thereon; and respective carriers having means thereon for supporting the carried originals at a respective distance from the optical system in accordance with a respective magnification, said supporting means comprising a pair of guide members respectively attached to opposite sides of said receptacle means, and each guide member comprising an elongated member having means thereon for cooperatingly engaging said conveyor means for transportation thereby, said cooperatingly engaging means comprising means for engaging a respective diameter portion of said conveyor shafts.

* * * * *